US010103812B2

(12) United States Patent
Busche et al.

(10) Patent No.: US 10,103,812 B2
(45) Date of Patent: Oct. 16, 2018

(54) SATELLITE COMMUNICATION SYSTEM

(71) Applicant: The Boeing Company, Chicago, IL (US)

(72) Inventors: Greg Busche, Rollings Hills, CA (US); John M. Sullivan, Manhattan Beach, CA (US); Lindsay E. Krejcarek, Redondo Beach, CA (US); Jeffrey M. Jesiolowski, Playa del Rey, CA (US); Ying J. Feria, Manhattan Beach, CA (US); David A. Whelan, Newport Coast, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/007,978

(22) Filed: Jan. 27, 2016

(65) Prior Publication Data

US 2017/0214462 A1 Jul. 27, 2017

(51) Int. Cl.
*H04B 10/00* (2013.01)
*H04B 10/118* (2013.01)
*H04B 7/185* (2006.01)
*H04B 10/29* (2013.01)
*H04W 88/16* (2009.01)

(52) U.S. Cl.
CPC ......... *H04B 10/118* (2013.01); *H04B 7/1851* (2013.01); *H04B 7/18502* (2013.01); *H04B 7/18504* (2013.01); *H04B 7/18508* (2013.01); *H04B 7/18513* (2013.01); *H04B 10/29* (2013.01); *H04W 88/16* (2013.01)

(58) Field of Classification Search
CPC . H04B 10/118; H04B 7/18521; H04B 10/677
See application file for complete search history.

(56) References Cited

U.S. PATENT DOCUMENTS

| 5,949,766 A | 9/1999 | Ibanez-Meier et al. |
| 6,016,124 A | 1/2000 | Lo et al. |
| 6,240,072 B1 | 5/2001 | Lo et al. |
| 6,751,458 B1 | 6/2004 | Wang et al. |
| 7,020,463 B2 | 3/2006 | Bybee et al. |
| 7,103,280 B1 | 9/2006 | Ionov et al. |

(Continued)

FOREIGN PATENT DOCUMENTS

| WO | WO 01/58758 A2 | 8/2001 |
| WO | WO 01/78256 A1 | 10/2001 |

OTHER PUBLICATIONS

European Patent Office, Extended European Search Report, EP 17 15 2681 (dated Jun. 21, 2017).

(Continued)

*Primary Examiner* — Dzung Tran
(74) *Attorney, Agent, or Firm* — Walters & Wasylyna LLC

(57) ABSTRACT

A satellite communication system may include a communication satellite orbiting Earth, a user terminal in radio communication with the communication satellite through a user link, a communication relay apparatus operating at an altitude of approximately 65,000 feet and in optical communication with the communication satellite through a feeder link, and a gateway station in radio communication with the communication relay apparatus through a gateway link.

20 Claims, 7 Drawing Sheets

(56) References Cited

U.S. PATENT DOCUMENTS

| | | | |
|---|---|---|---|
| 7,190,908 B2* | 3/2007 | Conway | H04B 10/677 398/188 |
| 8,326,217 B2 | 12/2012 | Wahlberg et al. | |
| 8,643,719 B2* | 2/2014 | Vian | G07C 5/008 348/143 |
| 2003/0207684 A1* | 11/2003 | Wesel | H04B 7/18578 455/427 |
| 2008/0169958 A1* | 7/2008 | Cohen | G01S 19/015 342/14 |
| 2014/0038515 A1 | 2/2014 | Avellan et al. | |
| 2014/0341586 A1* | 11/2014 | Wyler | H04B 7/18521 398/115 |
| 2015/0367932 A1* | 12/2015 | Patel | B64C 39/024 244/12.1 |
| 2016/0368590 A1* | 12/2016 | Karem | B64C 3/16 |

OTHER PUBLICATIONS

Farserotu et al., "Scalable, Hybrid Opticai-RF Wireless Communication System for Broadband and Multimedia Service to Fixed and Mobile Users," Wireless Personal Commmunications.

\* cited by examiner

SATELLITE COMMUNICATION SYSTEM

FIELD

The present disclosure is generally related to satellite communications and, more particularly, to a satellite communications system utilizing an optical relay link for communication between a satellite and a ground station.

BACKGROUND

High-throughput satellites ("HTS") provide significantly more throughput than conventional fixed-satellite service satellites ("FSS") over the same orbital spectrum. The significant increase in capacity is achieved by high level frequency re-use and spot beam technology, which enables frequency re-use across multiple narrowly focused spot beams (usually in the order of hundreds of kilometers), such as in cellular networks. However, as the demand for satellite communications continues to increase, there continues to be a need for satellites configured to provide increased throughput. Due to this ever-increasing need for bandwidth and the limitations of the radio frequency ("RF") spectrum, increasing numbers of gateway ground stations distributed over larger regions are required, which may place gateway ground stations in undesirable geographic locations.

Accordingly, those skilled in the art continue with research and development efforts in the field of high-throughput satellite communications.

SUMMARY

In one example, the disclosed satellite communication system may include a communication satellite orbiting Earth, a user terminal in radio communication with the communication satellite through a user link, a communication relay apparatus in optical communication with the communication satellite through a feeder link, and gateway stations in radio communication with the communication relay apparatus through a gateway link.

In another example, the disclosed satellite communication relay apparatus may include a radio frequency terminal to transmit and receive radio frequency communication signals to and from a gateway station over a gateway link, and an optical terminal to transmit and receive optical communication signals to and from a communication satellite over a feeder link.

In yet another example, the disclosed method for providing satellite communication may include the steps of: (1) generating a user link for a first radio communication between a communication satellite and a user terminal, (2) generating a feeder link for an optical communication between the communication satellite and a communication relay apparatus, the communication relay apparatus operating at an altitude of between approximately 39,000 feet and approximately 180,000 feet, and (3) generating a gateway link for a second radio communication between the communication relay apparatus and a gateway station.

Other examples of the disclosed system, apparatus and method will become apparent from the following detailed description, the accompanying drawings and the appended claims.

DETAILED DESCRIPTION

Figure 1:
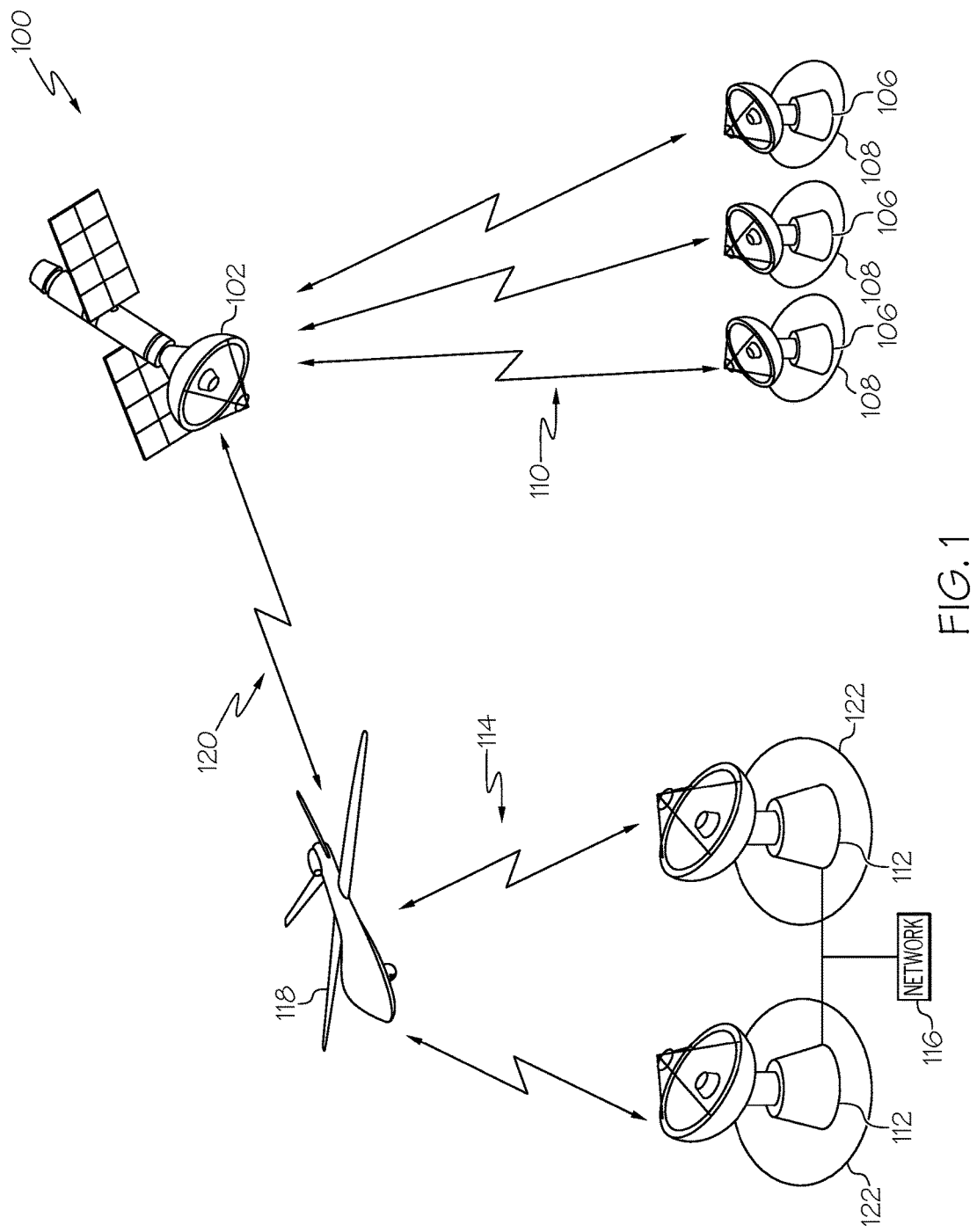
FIG. 1 is a schematic illustration of one example of the disclosed satellite communication system.

The following detailed description refers to the accompanying drawings, which illustrate specific examples described by the disclosure. Other examples having different structures and operations do not depart from the scope of the present disclosure. Like reference numerals may refer to the same feature, element, component or characteristic in the different drawings.

Reference herein to "example," "one example," "another example," or similar language means that one or more feature, structure, element, component or characteristic described in connection with the example is included in at least one embodiment or implementation. Thus, the phrases "in one example," "as one example," and similar language throughout the present disclosure may, but do not necessarily, refer to the same example. Further, the subject matter characterizing any one example may, but does not necessarily, include the subject matter characterizing any other example.

Illustrative, non-exhaustive examples, which may be, but are not necessarily, claimed, of the subject matter according to the present disclosure are provided below.

Figure 2:
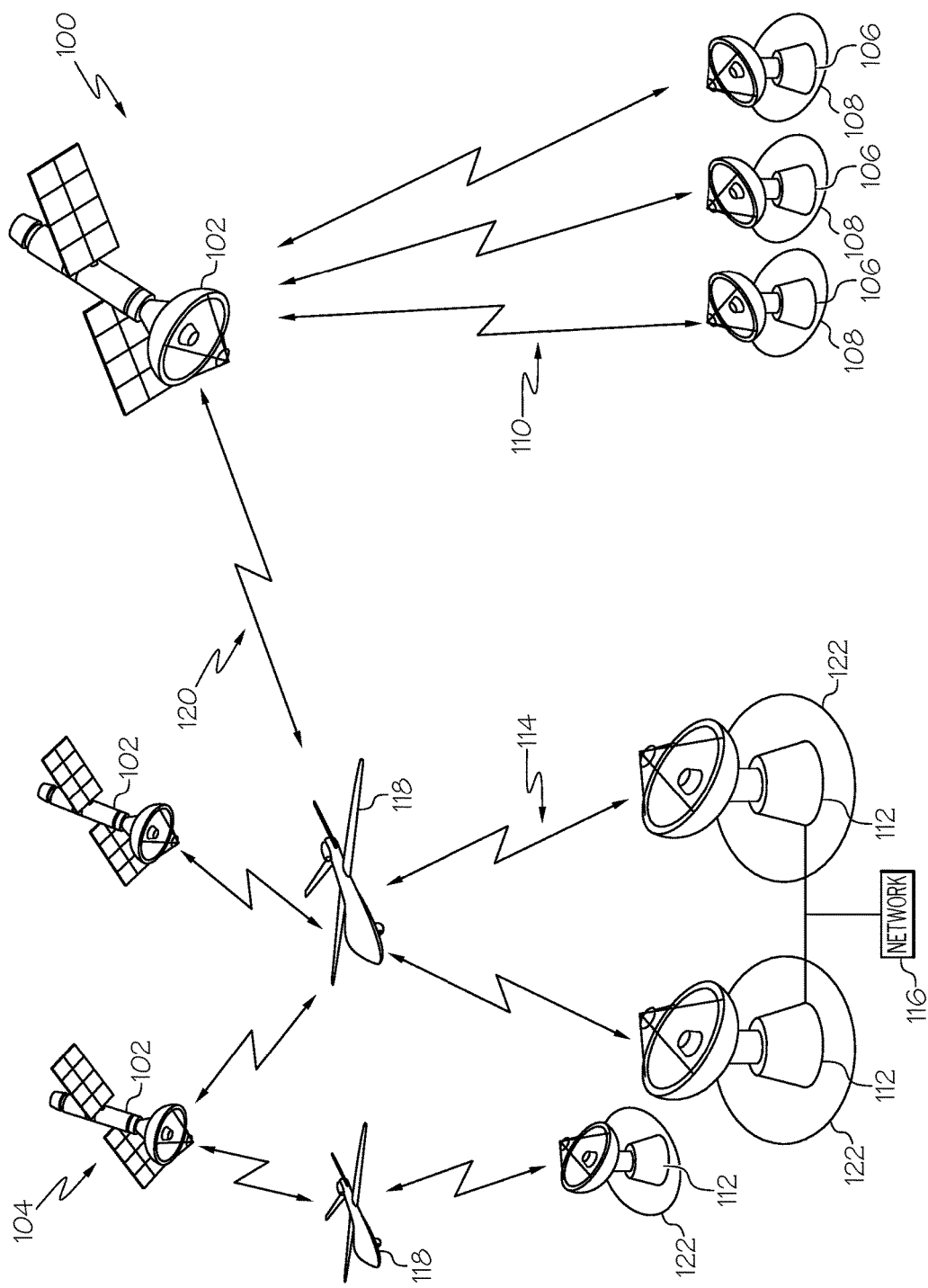
FIG. 2 is a schematic illustration of one example of the disclosed satellite communication system.

Referring to FIG. 1, one example of satellite communications system, generally referred to as system 100, is disclosed. System 100 may also be referred to as a satellite communications network. System 100 includes at least one communications satellite, generally referred to as satellite 102, orbiting Earth (not explicitly illustrated). System 100 also includes at least one gateway hub 122 and at least one user area 108. As illustrated in FIG. 2, in one example, a plurality of satellites 102 form satellite array 104.

Satellite 102 may be any object in any elliptical orbit and configured to transmit and/or receive communications to and from Earth. As one example, satellite 102 may be in geostationary orbit. As another example, satellite 102 may be geosynchronous orbit. As another example, satellite 102 may be in Molniya orbit.

System 100 may be particularly well suited and beneficial for satellite 102 in High Earth orbit ("HEO") (e.g., at an altitude above approximately 35,000 kilometers (22,000 miles)). However, system 100 may also be used with satellite 102 in other types of orbits, for example, Low Earth orbit ("LEO") (e.g., at an altitude below approximately 2,000 kilometers (1,200 miles)) or Medium Earth orbit ("MEO") (e.g., at an altitude between approximately 2,000 kilometers and 35,000 kilometers).

As one specific, non-limiting example, satellite 102 may be a high-throughput satellite ("HTS"). As one non-limiting example, satellite 102 may be configured to transmit and/or receive radio waves covering a microwave frequency range between approximately 1.0 GHz and approximately 90 GHz.

In one example, gateway hub 122 includes at least one gateway station 112 (also commonly referred to as a ground station or teleport). Gateway station 112 may include one or more transmitting and/or receiving antennas used to communicate with satellite 102 (or satellite array 104) (FIG. 2). As one general example, gateway hub 122 may be one or more of audio, video, and/or data service providers. As one example, gateway hub 122 may be an Internet service provider. As one example, gateway hub 122 may be a telephone, voice, and/or data service. As one example, gateway hub 122 may be a television, video, and/or audio broadcaster.

Gateway stations 112 may be coupled to terrestrial network 116. As one example, network 116 may include a telecommunications network, such as the Internet. Thus, gateways stations 112 may provide connectivity between user terminals 106 and network 116 through satellite 102 and communications relay apparatus 118.

While not explicitly illustrated, each gateway station 112 may include or be connected to a gateway station controller that controls the communication of signals over gateway hub 122. The gateway station controller may include a processor, a storage device (e.g., a memory), an input device, and/or a display. The gateway controller may be remotely located with or co-located with (e.g., integral to) gateway station 112.

In one example, user area 108 defines a geographic area that includes a plurality of user terminals 106 that can communicate with satellite 102 (only one user terminal is shown within each user area for clarity of illustration). As one example, user area 108 may represent a footprint of a radiated spot beam from satellite 102 to Earth's surface. The spot beam may include a predetermined signal strength (e.g., power) so that it will cover only a limited geographic area on Earth, represented by user area 108.

Each one of user terminals (also referred to herein as user terminal 106) includes one or more transmitting and/or receiving antennas used to communicate with satellite 102. User terminal 106 may include any communications device used by an end user (e.g., an audio, video, or data communications device). Thus, the audio, video, and/or data service provider may service user terminals 106 located within user area 108.

While not explicitly illustrated in FIGS. 1 and 2, in another example, user area 108 may also include one or more terrestrial communication network sites or towers. The communication network site may include one or more transmitting and/or receiving antennas used to communicate with satellite 102 and user terminals 106. In other words, the communication network site may serve as a terrestrial communications link or relay between satellite 102 and user terminals 106 and/or among user terminals 106.

While not explicitly illustrated, each user terminal 106 may include or be connected to a user terminal controller that controls the communication of signals over user area 108. The user terminal controller may include a processor, a storage device (e.g., a memory), an input device, and/or a display. The user terminal controller may be remotely located with or co-located with (e.g., integral to) user terminal 106.

In one example, system 100 also includes at least one communications relay apparatus, generally referred to as apparatus 118. Apparatus 118 serves as a communications link, node, or relay between satellite 102 and one or more gateway stations 112. In other words, apparatus 118 may serve one or more gateway hubs 122.

In one example, apparatus 118 is a mobile platform capable of operating at a high altitude. Generally, the operating altitude of apparatus 118 may be above any atmospheric interference. As one example, apparatus 118 may operate at an altitude of between approximately 39,000 feet (12 km) and approximately 180,000 feet (55 km) (e.g., stratosphere). As another example, apparatus may operate at an altitude of between 55,000 feet (16 km) and approximately 164,000 feet (50 km). As another example, apparatus 118 may operate at an altitude of approximately 65,000 feet (20 km). As yet another example, apparatus 118 may operate at an altitude of at least approximately 65,000 feet (20 km).

As one example, apparatus 118 may be an unmanned aerial vehicle ("UAV"). Apparatus 118 may fly in a predetermined flight path over a given geographic area on Earth, such as over one or more gateway hubs 122. Apparatus 118 may be capable of flying for long periods of time (e.g., for several months) at the operating altitude. As one example, apparatus 118 may be a solar-powered electric UAV.

Referring to FIG. 1, satellite 102 communicates with user terminals 106 (e.g., either directly or via the terrestrial communication network site). Satellite 102 may be configured to transmit and/or receive radio frequency ("RF") communication signals to and from user terminals 106. Similarly, user terminals 106 may be configured to transmit and/or receive RF communication signals to and from satellite 102. Any RF communication signals between satellite 102 and user terminals 106 are referred to herein as user links 110. Thus, user links 110 are RF (RF communication) links. Each user terminal 106 may receive the RF communication signal within an associated spot beam of a multiple spot beam pattern (not explicitly illustrated) radiated from satellite 102. The multiple spot beam pattern may re-use frequencies across multiple narrowly focused spot beams defining user areas 108 (e.g., in the order of hundreds of kilometers).

Satellite 102 also communicates with apparatus 118. Satellite 102 may be configured to transmit and/or receive optical communication signals to and from apparatus 118. Similarly, apparatus 118 may be configured to transmit and/or receive optical communications signals to and from satellite 102. Any optical communication signals between satellite 102 and apparatus 118 are referred to herein as feeder links 120. Thus, feeder links 120 are optical (optical communication) links.

Apparatus 118 communicates with gateway stations 112. Apparatus 118 may be configured to transmit and/or receive RF communication signals to and from gateway station 112. Similarly, gateway station 112 may be configured to transmit and/or receive RF communication signals to and from apparatus 118. Any RF communication signals between apparatus 118 and gateway station 112 are referred to herein as gateway links 114. Thus, gateway links 114 are RF (RF communication) links.

Figure 3:
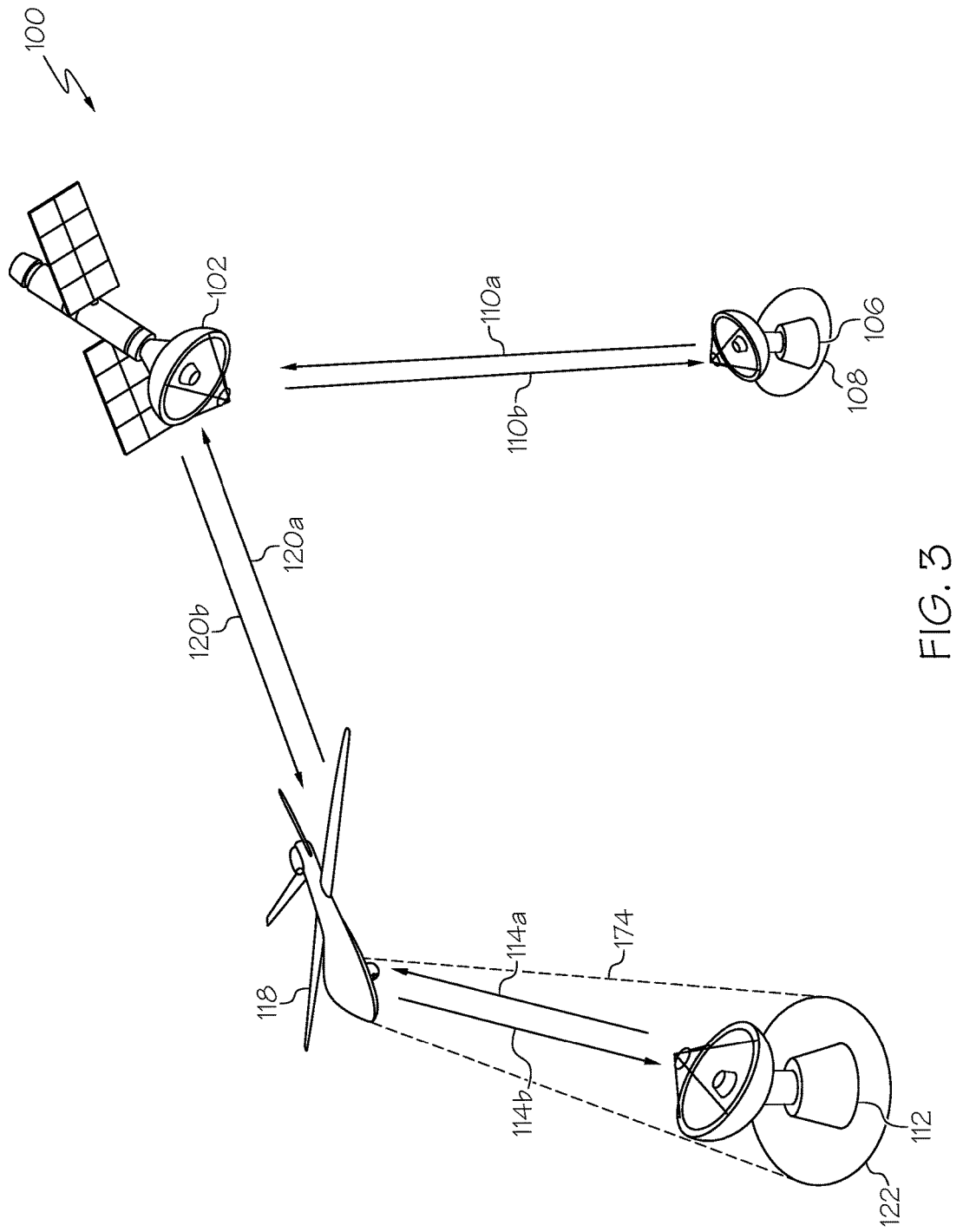
FIG. 3 is a schematic illustration of one example of the disclosed satellite communication system.

Referring to FIG. 3, and with reference to FIGS. 1 and 2, satellite 102 and apparatus 118 are configured to provide two-way communication between each one of user areas 108 (e.g., user terminals 106) and each one of gateway hubs 122 (e.g., gateway stations 112). As one example, and as illustrated in FIG. 3, user area 108 transmits user uplink 110a (e.g., a user uplink signal) as an RF signal (also referred to as a user uplink radio frequency communication signal) to satellite 102. Satellite 102 transmits feeder downlink 120b (e.g., a retransmission of the user uplink signal) as an optical signal (also referred to as a feeder downlink optical communication signal) to apparatus 118. Apparatus 118 then transmits gateway downlink 114b (e.g., another retransmission of the user uplink signal) as an RF signal (also referred to as a gateway downlink radio frequency communication signal) to gateway station 112.

Similarly, as one example, gateway station 112 transmits gateway uplink 114a (e.g., a gateway uplink signal) as an RF signal (also referred to as a gateway uplink radio frequency communication signal) to apparatus 118. Apparatus 118 transmits feeder uplink signal 120a (e.g., a retransmission of the gateway uplink signal) as an optical signal (also referred to as a feeder uplink optical communication signal) to satellite 102. Satellite 102 then transmits user downlink 110b (e.g., another retransmission of the gateway uplink signal) as an RF signal (also referred to as a user downlink radio frequency communication signal) to user terminal 106.

In one example implementation, user link 110 (e.g., user uplink 110a and/or user downlink 110b) may operate in a frequency range (e.g., an operating frequency or range of operating frequencies) of between approximately 1 GHz and approximately 40 GHz. In another example implementation, user link 110 (e.g., user uplink 110a and/or user downlink 110b) may operate in a frequency range (e.g., an operating frequency or range of operating frequencies) of between approximately 20 GHz and approximately 40 GHz (e.g., the K band). In another example implementation, user link 110 (e.g., user uplink 110a and/or user downlink 110b) may operate in a frequency range of between approximately 19.0 GHz and approximately 31 GHz (e.g., the Ka band). In another example implementation, user link 110 (e.g., user uplink 110a and/or user downlink 110b) may operate in a frequency range of between approximately 12 GHz and approximately 18 GHz (e.g., the Ku band). In still other example implementations, user link 110 (e.g., user uplink 110a and/or user downlink 110b) may operate in various other frequency ranges, for example, between approximately 8 GHz and approximately 12 GHz (e.g., the X band), between approximately 500 MHz and approximately 1000 MHz (e.g., the C band), between approximately 1 GHz and approximately 2 GHz (e.g., the L band), etc.

In one example implementation, gateway link 114 (e.g., gateway uplink 114a and/or gateway downlink 114b) may operate in a frequency range of between approximately 12 GHz and approximately 18 GHz (e.g., the Ku band). In another example implementation, gateway link 114 (e.g., gateway uplink 114a and/or gateway downlink 114b) may operate in a frequency range of between approximately 19 GHz and approximately 31 GHz (e.g., the Ka band). In still other example implementations, gateway link 114 (e.g., gateway uplink 114a and/or gateway downlink 114b) may operate in various other frequency ranges.

In one example implementation, feeder link 120 (e.g., feeder uplink 120a and/or feeder downlink 120b) may operate in a frequency range of between approximately 100 THz and approximately 400 THz. In other example implementations, feeder link 120 (e.g., feeder uplink 120a and/or feeder downlink 120b) may operate in various other frequency ranges.

Figure 4:
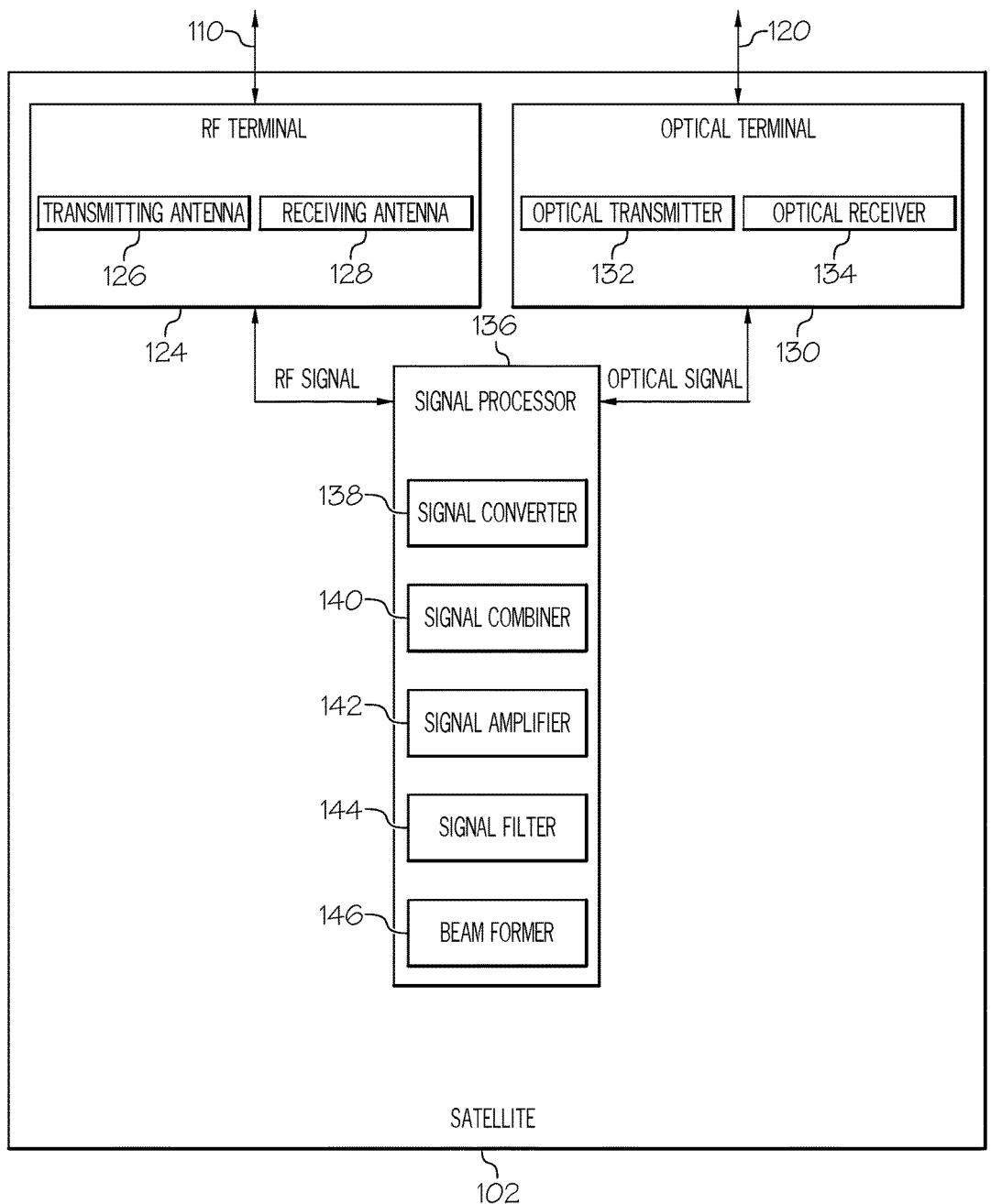
FIG. 4 is a schematic block diagram of one example if the disclosed communication satellite of the satellite communication system.

Referring to FIG. 4, and with reference to FIG. 3, in one example, satellite 102 includes satellite RF terminal 124 configured to transmit and/or receive RF communication signals (e.g., user link 110) to and from user terminals 106. As one example, satellite RF terminal 124 may include satellite transmitting antenna 126 configured to transmit RF signals and satellite receiving antenna 128 configured to receive RF signals. As one example, satellite RF terminal 124 (e.g., satellite transmitting antenna 126 and/or satellite receiving antenna 128) may be a phased-array antenna. As one example, satellite RF terminal 124 may include a high-gain antenna for communication with user terminals 106 over user link 110. While satellite RF terminal 124 is illustrated as having an individual satellite transmitting antenna and satellite receiving antenna, in another example, satellite RF terminal 124 may have a single satellite antenna capable of both transmitting and receiving RF signals.

In one example, satellite 102 includes satellite optical terminal 130 configured to transmit and/or receive optical communication signals (e.g., feeder link 120) to and from apparatus 118. As one example, satellite optical terminal 130 may include satellite optical transmitter 132 configured to transmit optical signals from satellite 102 and satellite optical receiver 134 configured to receive optical signals from apparatus 118. While satellite optical terminal 130 is illustrated as having an individual satellite optical transmitter and satellite optical receiver, in another example, satellite optical terminal 130 may have a single satellite transmitter/receiver capable of both transmitting and receiving optical signals.

Referring to FIG. 4, and with reference to FIG. 3, in one example, satellite 102 includes satellite signal processor 136 configured to process the communication signals transmitted and/or received by satellite 102. As one example, satellite signal processor 136 may (may be configured to) convert RF signals to optical signals and/or optical signals to RF signals.

As one example, RF signals that are received by satellite RF terminal 124 through user link 110 (e.g., user uplink 110a) include data destined for retransmission to gateway station 112 via apparatus 118. The RF signals are routed through satellite signal processor 136 where they are converted into optical signals and transmitted to apparatus 118 through feeder link 120 (e.g., feeder downlink 120b).

As one example, optical signals that are received by satellite optical terminal 130 through feeder link 120 (e.g., feeder uplink 120a) include data destined for retransmission to user terminal 106. The optical signals are routed through satellite signal processor 136 where they are converted into RF signals and transmitted to user terminals 106 through user link 110 (e.g., user downlink 110b).

As one example, satellite signal processor 136 may (may be configured to) combine multiple (e.g., a plurality of) RF signals received through user link 110, for example, from the plurality of user terminals 106, into a single optical signal.

As one example, satellite signal processor 136 may (may be configured to) amplify the RF signal and/or the optical signal transmitted and/or received by satellite 102.

As one example, satellite signal processor 136 may (may be configured to) filter the RF signal and/or the optical signal transmitted and/or received by satellite 102.

As one example, satellite signal processor 136 may (may be configured to) form one or more spot beams (defining one or more user areas 108) that includes the RF signal transmitted by satellite 102. As one example, satellite signal processor 136 may route a portion of the RF signal that corresponds to a particular user area 108 to a particular spot beam corresponding to that user area 108. As one example, satellite signal processor 136 may form each spot beam to correspond to a specific frequency range that depends, for example, of the total bandwidth, channel bandwidth, and/or re-use factors.

Therefore, as one example, satellite signal processor 136 may include satellite signal converter 138, satellite signal combiner 140, satellite signal amplifier 142, satellite signal filter 144, and/or satellite beam former 146. Satellite signal processor 136 may include hardware, software, or a combination thereof configured to facilitate the functions described above. While not explicitly illustrated, satellite signal processor 136 may include a processor, a storage device (e.g., a memory), an input device, and/or a display. Satellite signal processor 136 may also include other components not expressly illustrated.

Figure 5:
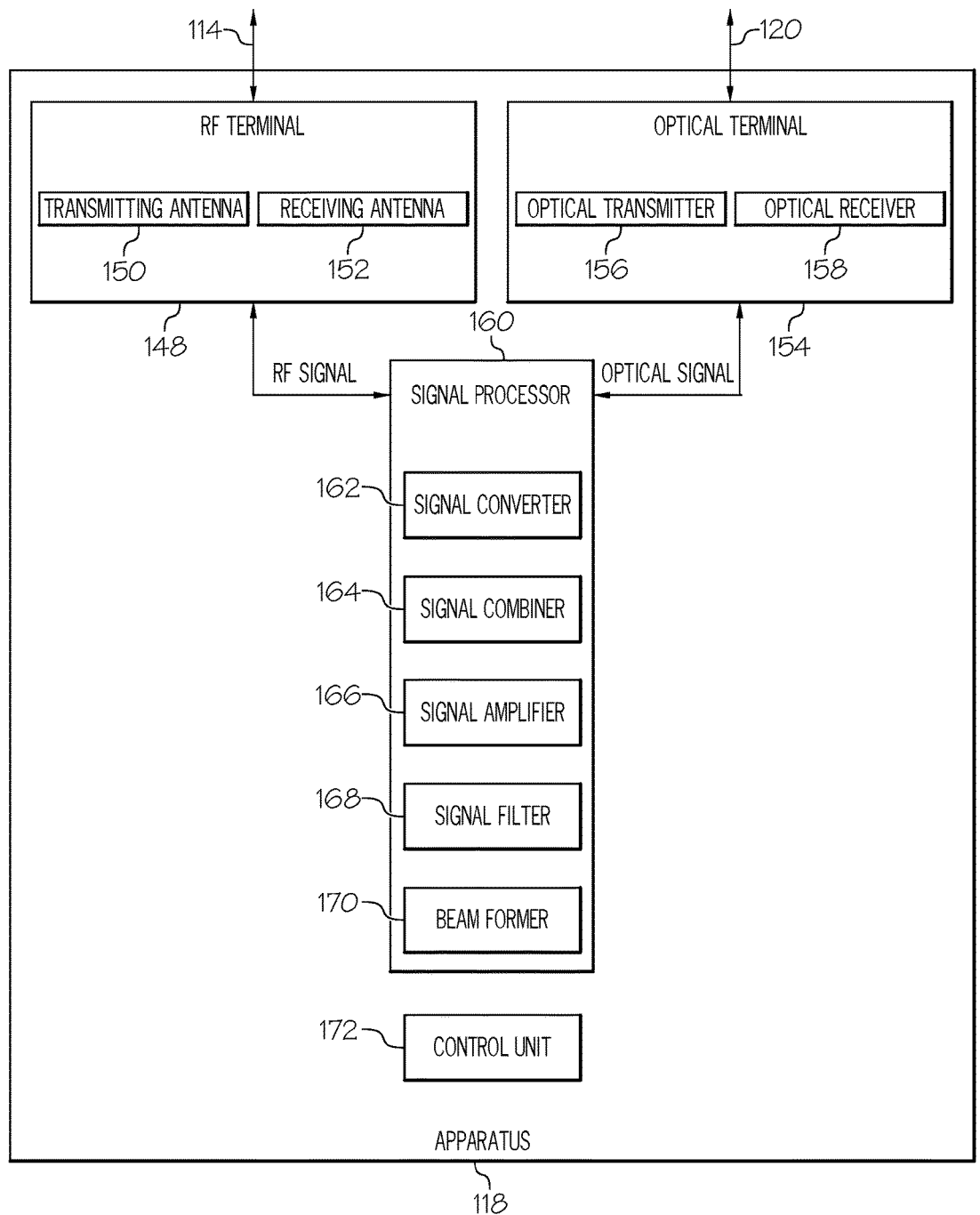
FIG. 5 is a schematic block diagram of one example of the disclosed communications relay apparatus of the satellite communication system.

Referring to FIG. 5, and with reference to FIG. 3, in one example, apparatus 118 includes apparatus RF terminal 148 configured to transmit and/or receive RF communication signals (e.g., gateway link 114) to and from gateway station 112. As one example, apparatus RF terminal 148 may include apparatus transmitting antenna 150 configured to transmit RF signals and apparatus receiving antenna 152 configured to receive RF signals. As one example, apparatus RF terminal 148 (e.g., apparatus transmitting antenna 150 and/or apparatus receiving antenna 152) may be a phased-array antenna. While apparatus RF terminal 148 is illustrated as having an individual apparatus transmitting antenna and apparatus receiving antenna, in another example, apparatus RF terminal 148 may have a single apparatus antenna capable of both transmitting and receiving RF signals.

In one example, apparatus 118 includes apparatus optical terminal 154 configured to transmit and/or receive optical communication signals (e.g., feeder link 120) to and from satellite 102. As one example, apparatus optical terminal 154 may include apparatus optical transmitter 156 configured to transmit optical signals from apparatus 118 and apparatus optical receiver 158 configured to receive optical signals from satellite 102. While apparatus optical terminal 154 is illustrated as having an individual apparatus optical transmitter and apparatus optical receiver, in another example, apparatus optical terminal 154 may have a single apparatus transmitter/receiver capable of both transmitting and receiving optical signals.

Referring to FIG. 5, and with reference to FIG. 3, in one example, apparatus 118 includes apparatus signal processor 160 configured to process the communication signals transmitted and/or received by apparatus 118. As one example, apparatus signal processor 160 may (may be configured to) convert RF signals to optical signals and/or optical signals to RF signals. As one example, apparatus signal processor 160 may convert the feeder downlink optical communication signal to the gateway downlink radio frequency communication signal.

As one example, RF signals that are received by apparatus RF terminal 148 through gateway link 114 (e.g., gateway uplink 114a) include data destined for retransmission to user terminals 106 via satellite 102. The RF signals are routed through apparatus signal processor 160 where they are converted into optical signals and transmitted to satellite 102 through feeder link 120 (e.g., feeder uplink 120a). As one example, apparatus signal processor 260 may convert the gateway uplink radio frequency communication signal to the feeder uplink optical communication signal.

As one example, optical signals that are received by apparatus optical terminal 154 through feeder link 120 (e.g., feeder downlink 120b) include data destined for retransmission to gateway station 112. The optical signals are routed through apparatus signal processor 160 where they are converted into RF signals and transmitted to gateway station 112 through gateway link 114 (e.g., gateway downlink 114b).

In one example, apparatus 118 may include a single apparatus RF terminal 148 capable of communicating with one or more gateway stations 112 (as illustrated in FIG. 5). In another example (not explicitly illustrated), apparatus 118 may include more than one apparatus RF terminal 148, each one being capable of communicating with a particular gateway station 112.

As one example, apparatus signal processor 160 may (may be configured to) combine multiple (e.g., a plurality of) RF signals received through gateway link 114, for example, from the plurality of gateway stations 112, into a single optical signal.

As one example, apparatus signal processor 160 may (may be configured to) amplify the RF signal and/or the optical signal transmitted and/or received by apparatus 118.

As one example, apparatus signal processor 160 may (may be configured to) filter the RF signal and/or the optical signal transmitted and/or received by apparatus 118.

As one example, apparatus signal processor 160 may (may be configured to) form one or more spot beams 174 (FIG. 3) (defining one or more gateway hubs 122) that includes the RF signal transmitted by apparatus 118. As one example, apparatus signal processor 160 may route a portion of the RF signal that corresponds to a particular gateways station 112 to a particular spot beam 174 corresponding to that gateway hub 122. As one example, apparatus signal processor 160 may form each spot beam 174 to correspond to a specific frequency range that depends, for example, of the total bandwidth, channel bandwidth, and/or re-use factors.

Therefore, as one example, apparatus signal processor 160 may include apparatus signal converter 162, apparatus signal combiner 164, apparatus signal amplifier 166, apparatus signal filter 168, and/or apparatus beam former 170. Apparatus signal processor 160 may include hardware, software, or a combination thereof configured to facilitate the functions described above. While not explicitly illustrated, apparatus signal processor 160 may include a processor, a storage device (e.g., a memory), an input device, and/or a display. Apparatus signal processor 160 may also include other components not expressly illustrated.

Referring to FIG. 5, in one example, apparatus 118 may include control unit 172. Control unit 172 may (may be configured to) provide command and control to apparatus 118. As non-limiting examples, control unit 172 may control the flight path of apparatus 118, the flight duration of apparatus 118, the altitude of apparatus 118, with which one or more gateway stations apparatus 118 communicates, with which one or more satellites apparatus 118 communicates, and the like. Control unit 172 may include hardware, software, or a combination thereof configured to facilitate the functions described above. While not explicitly illustrated, control unit may include a processor, a storage device (e.g., a memory), an input device, and/or a display.

Referring to FIGS. 1 and 2, the disclosed system 100 may be implemented in a variety of different ways. As one example, and as illustrated in FIG. 1, system 100 may include one satellite 102 optically coupled to one apparatus 118. As one example, and as illustrated in FIG. 2, system 100 may include a plurality of satellites 102 optically coupled to one apparatus 118. As another example, and as illustrated in FIG. 2, system 100 may include a plurality of satellites 102 optically coupled to a plurality of apparatuses 118.

Figure 6:
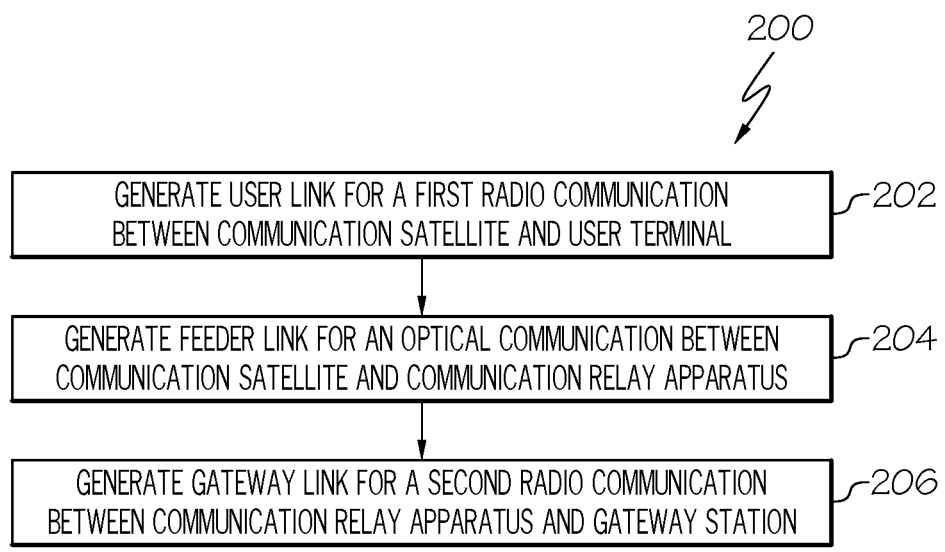
FIG. 6 is a flow diagram of one example of the disclosed method for providing satellite communications.

Referring to FIG. 6, and with reference to FIGS. 1-5, one example of method, generally designated 200, is disclosed. Method 200 is one example implementation of a method for providing satellite communications, for example utilizing the disclosed system 100. Modifications, additions, or omissions may be made to method 200 without departing from the scope of the present disclosure. Method 200 may include more, fewer, or other steps. Additionally, steps may be performed in any suitable order.

In one example implementation, method 200 includes the step of generating user link 110 for a first radio communication (e.g., a radio frequency communication signal) between communication satellite 102 and one or more user terminals 106, as shown at block 202.

In one example implementation, method 200 includes the step of generating feeder link 120 for an optical communication (e.g., an optical communication signal) between communication satellite 102 and communication relay apparatus 118, as shown at block 204. In one example, communication relay apparatus 118 may operate at an altitude of between approximately 39,000 feet (12 km) and approximately 180,000 feet (e.g., 55 km), for example, approximately (e.g., at least) 65,000 feet (20 km).

In one example implementation, method 200 includes the step of generating gateway link 114 for a second radio communication (e.g., a radio frequency communication signal) between communication relay apparatus 118 and one or more gateway stations 112, as shown at block 206.

Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

Accordingly, the disclosed system 100 provides a communication signal relay between satellite 102 and one or more gateway stations 112 via feeder link 120 (optical link) between satellite 102 and apparatus 118 and gateway link 114 (RF link) between apparatus 118 and gateway stations 112. By utilizing apparatus 118 to split the communication signal between satellite 102 and gateway station 112, system 100 is capable of increasing communication efficiency. Feeder link 120 (e.g., optical communication link) may provide significantly greater available bandwidth, provide higher data transfer rates, and improve link efficiency as compared to standard RF communication link between a communication satellite and a gateway station.

Further, with apparatus 118 operating at a sufficiently high altitude (e.g., above any atmospheric interference), the effect of weather and atmosphere on feeder link 120 is reduced, if not eliminated. Further, gateway link 114 (e.g., RF communication link) generated at apparatus 118 (e.g., at high altitude) may not be affected by weather and atmosphere and the RF spectrum may be re-used more efficiently by allowing gateway stations 112 to be located in a closer spatial relationship. Thus, the combination of feeder link 120 between satellite 102 and apparatus 118 and gateway link 114 between apparatus 118 and gateway station 112 may be capable of carrying the capacity of all of user link 110 from all user terminals 106.

Even further, apparatus 118 may perform one or more tasks and/or functions that would typically be performed on satellite 102 including, but not limited to, complete or partial beam forming, signal processing, and the like.

Figure 7:
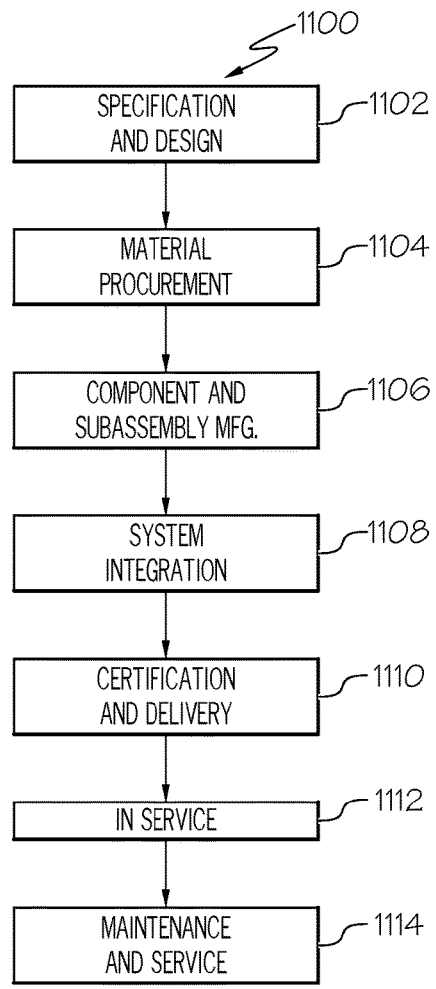
FIG. 7 is a block diagram of aircraft production and service methodology.
Figure 8:
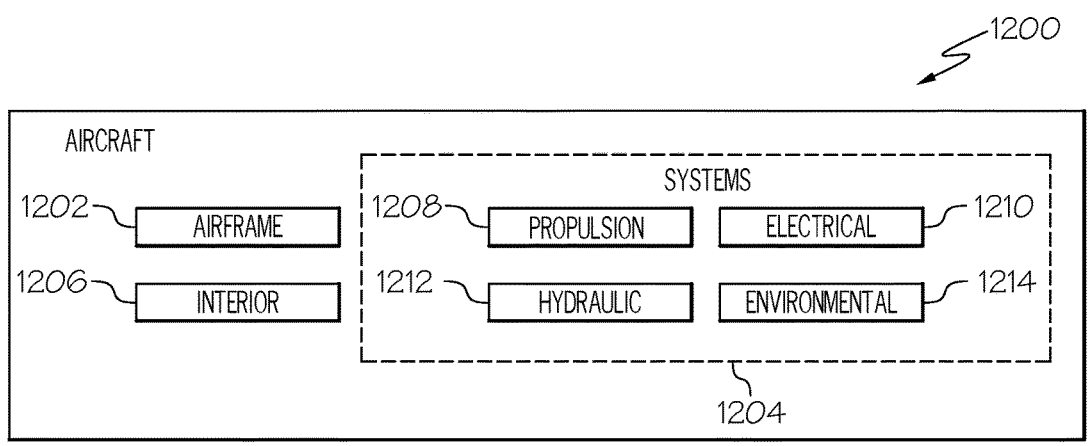
FIG. 8 is a schematic illustration of an aircraft.

Examples of the disclosed apparatus 118 may be described in the context of aircraft manufacturing and service method 1100 as shown in FIG. 7 and aircraft 1200 as shown in FIG. 8. Aircraft 1200 may be one example of apparatus 118 (e.g., a UAV).

During pre-production, the illustrative method 1100 may include specification and design, as shown at block 1102, of aircraft 1200, which may include design of apparatus RF terminal 148, apparatus optical terminal 154, and/or apparatus signal processor 160, and material procurement, as shown at block 1104. During production, component and subassembly manufacturing, as shown at block 1106, and system integration, as shown at block 1108, of aircraft 1200 may take place. Apparatus RF terminal 148, apparatus optical terminal 154, and/or apparatus signal processor 160 as described herein may be incorporated as a portion of the production, component and subassembly manufacturing step (block 1106) and/or as a portion of the system integration (block 1108). Thereafter, aircraft 1200 may go through certification and delivery, as shown block 1110, to be placed in service, as shown at block 1112. While in service, aircraft 1200 may be scheduled for routine maintenance and service, as shown at block 1114. Routine maintenance and service may include modification, reconfiguration, refurbishment, etc. of one or more systems of aircraft 1200.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 8, aircraft 1200 produced by illustrative method 1100 may include airframe 1202, and a plurality of high-level systems 1204 and interior 1206. Examples of high-level systems 1204 include one or more of propulsion system 1208, electrical system 1210, hydraulic system 1212 and/or environmental system 1214. Any number of other systems may be included.

The apparatus shown or described herein may be employed during any one or more of the stages of the manufacturing and service method 1100. For example, components or subassemblies corresponding to component and subassembly manufacturing (block 1106) may be fabricated or manufactured in a manner similar to components or subassemblies produced while aircraft 1200 is in service (block 1112). Also, one or more examples of the apparatus may be employed during production stages (blocks 1108 and 1110). Similarly, one or more examples of the apparatus may be utilized, for example and without limitation, while aircraft 1200 is in service (block 1112) and during maintenance and service stage (block 1114).

Although various examples of the disclosed system, apparatus, and method have been shown and described, modifications may occur to those skilled in the art upon reading the specification. The present application includes such modifications and is limited only by the scope of the claims.

What is claimed is:

1. A satellite communication system comprising:
a communication satellite orbiting Earth;
a user terminal in radio communication with said communication satellite through a user link;
a plurality of gateway stations on Earth; and
an unmanned aircraft operating at an altitude of between approximately 39,000 feet and approximately 180,000 feet and serving as a communications relay between said communication satellite and each one of said plurality of gateway stations, said unmanned aircraft being in optical communication with said communication satellite through a feeder link and in radio communication with each one of said gateway station through a gateway link, and said unmanned aircraft comprising:

a control unit operable to control flight of said unmanned aircraft along a predetermined flight path; and a signal processor operable to process communication signals received by said unmanned aircraft and transmit radio frequency communication signals in the form of a plurality of spot beams, wherein each one of said plurality of spot beams covers a corresponding one of said plurality of gateway stations and has a frequency selected for a corresponding one of said plurality of gateway stations.

2. The system of claim 1 wherein said user link comprises a radio frequency communication signals.

3. The system of claim 2 wherein said user radio frequency communication signals of said user link comprises an operating frequency between approximately 1 GHz and approximately 40 GHz.

4. The system of claim 1 wherein said gateway link comprises a gateway radio frequency communication signals.

5. The system of claim 4 wherein said gateway radio frequency communication signals of said gateway link comprises at least one of an operating frequency between approximately 12 GHz and approximately 18 GHz, and an operating frequency between approximately 19 GHz and approximately 31 GHz.

6. The system of claim 1 wherein said feeder link comprises an optical communication signal.

7. The system of claim 1 wherein said unmanned aircraft further comprises:
a radio frequency terminal coupled to said signal processor and operable to transmit and receive radio frequency communication signals over said gateway link; and
an optical terminal coupled to said signal processor and operable to transmit and receive optical communication signals over said feeder link.

8. The system of claim 7 wherein said radio frequency terminal transmits a gateway downlink radio frequency communication signal to a corresponding one of said plurality of gateway stations in the form of a corresponding one of the plurality of spot beams, and wherein said radio frequency terminal receives a gateway uplink radio frequency communication signal from said gateway station.

9. The system of claim 8 wherein said optical terminal transmits a feeder uplink optical communication signal to said communication satellite, and wherein said optical terminal receives a feeder downlink optical communication signal from said communication satellite.

10. The system of claim 9 wherein said signal processor further comprises a signal converter operable to convert said feeder downlink optical communication signal to said gateway downlink radio frequency communication signal and to convert said gateway uplink radio frequency communication signal to said feeder uplink optical communication signal.

11. The system of claim 10 wherein said signal processor further comprises a signal combiner operable to combine a plurality of gateway uplink radio frequency communication signals onto a combined gateway uplink radio frequency communication signal.

12. The system of claim 11 wherein said signal converter is further operable to convert said combined gateway uplink radio frequency communication signal to said feeder uplink optical communication signal.

13. The system of claim 10 wherein said signal processor further comprises a beam former operable to form said plurality of spot beams, each comprising said gateway downlink radio frequency communication signal having an operating frequency selected for a corresponding one of said plurality of gateway stations.

14. The system of claim 1 wherein said unmanned aircraft comprises a fixed wing aircraft that utilizes a solar-powered propulsion system.

15. An unmanned aircraft used in a satellite communications network, said unmanned aircraft comprising:
an airframe;
a control unit operable to control flight of said unmanned aircraft along a predetermined flight path;
a radio frequency terminal to transmit and receive radio frequency communication signals to and from a plurality of gateway stations;
an optical terminal to transmit and receive optical communication signals to and from a communication satellite in Earth orbit; and
a signal processor coupled to said radio frequency terminal and said optical terminal, said signal processor being operable to process said radio frequency communication signals and said optical communication signals and further operable to transmit said radio frequency communication signals in the form of a plurality of spot beams, wherein each one of said plurality of spot beams covers a corresponding one of said plurality of gateway stations and has a frequency selected for a corresponding one of said plurality of gateway stations.

16. The unmanned aircraft of claim 15 wherein:
said radio frequency terminal transmits a gateway downlink radio frequency communication signal to each one of said plurality of gateway stations,
said radio frequency terminal receives a gateway uplink radio frequency communication signal from each one of said plurality of gateway stations,
said optical terminal transmits a feeder uplink optical communication signal to said communication satellite, and
said optical terminal receives a feeder downlink optical communication signal from said communication satellite.

17. The unmanned aircraft of claim 16 wherein said signal processor comprises:
a signal converter operable to convert said feeder downlink optical communication signal to said gateway downlink radio frequency communication signal and to convert said gateway uplink radio frequency communication signal to said feeder uplink optical communication signal; and
a beam former operable to form said plurality of spot beams, each comprising said gateway downlink radio frequency communication signal having an operating frequency selected for a corresponding one of said plurality of gateway stations.

18. The unmanned aircraft of claim 16 further comprising a solar-powered propulsion system configured to operate at an altitude of between approximately 39,000 feet and approximately 180,000 feet.

19. A method for providing satellite communication, said method comprising:
continuously operating an unmanned aircraft at an altitude of between approximately 39,000 feet and approximately 180,000 feet;
controlling flight of said unmanned aircraft along a predetermined flight path;
generating a radio frequency user link between a communication satellite in Earth orbit and a user terminal;

generating an optical feeder link between said communication satellite and said unmanned aircraft;
generating a plurality of radio frequency gateway links between said fixed-wing unmanned aircraft and a plurality of gateway stations;
transmitting a feeder downlink optical communication signal from said communication satellite to said unmanned aircraft;
converting said feeder downlink optical communication signal into a gateway downlink radio frequency communication signal;
transmitting said gateway downlink radio frequency communication signal from said unmanned aircraft to said plurality of gateway stations in the form of a plurality of spot beams, wherein each one of said plurality of spot beams covers a corresponding one of said plurality of gateway stations and has a frequency selected for a corresponding one of said plurality of gateway stations.

20. The method of claim 19 wherein said unmanned aircraft is solar powered.

* * * * *